(12) United States Patent
Johansen et al.

(10) Patent No.: US 10,063,979 B2
(45) Date of Patent: Aug. 28, 2018

(54) HEARING AID WITH POWER MANAGEMENT

(71) Applicant: GN Hearing A/S, Ballerup OT DK (DK)

(72) Inventors: Jan Johansen, Koge (DK); Kim Rasmussen, Ballerup (DK)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 14/964,457

(22) Filed: Dec. 9, 2015

(65) Prior Publication Data
US 2017/0164120 A1 Jun. 8, 2017

(30) Foreign Application Priority Data

Dec. 8, 2015 (DK) .................................. 2015 70809
Dec. 8, 2015 (EP) ..................................... 15198342

(51) Int. Cl.
*H04R 25/00* (2006.01)
*H02J 7/02* (2016.01)

(52) U.S. Cl.
CPC .............. *H04R 25/30* (2013.01); *H02J 7/025* (2013.01); *H04R 25/305* (2013.01); *H04R 25/558* (2013.01); *H04R 25/554* (2013.01); *H04R 2225/31* (2013.01); *H04R 2225/33* (2013.01)

(58) Field of Classification Search
CPC .. H04R 25/00; H04R 25/602; H04R 2225/31; H04R 2225/33
USPC ................................................ 381/312, 323
See application file for complete search history.

(56) References Cited

U.S. PATENT DOCUMENTS

| | | |
|---|---|---|
| 6,330,339 B1 | 12/2001 | Ishige et al. |
| 2007/0253584 A1 | 11/2007 | Rass |
| 2008/0009918 A1 | 1/2008 | Zierhofer et al. |
| 2009/0087005 A1 | 4/2009 | Reithinger |
| 2009/0214064 A1 | 8/2009 | Wu et al. |
| 2009/0285426 A1 | 11/2009 | Boguslavskij |
| 2012/0189146 A1 | 7/2012 | Wuidart |
| 2013/0195295 A1 | 8/2013 | van Halteren et al. |

(Continued)

FOREIGN PATENT DOCUMENTS

| | | |
|---|---|---|
| EP | 2 547 124 A2 | 1/2013 |
| EP | 2 547 124 A3 | 2/2015 |

(Continued)

OTHER PUBLICATIONS

Extended European Search Report dated May 24, 2016 for corresponding EP Patent Application No. 15198342.6, 8 pages.

(Continued)

*Primary Examiner* — Suhan Ni
(74) *Attorney, Agent, or Firm* — Vista IP Law Group, LLP

(57) ABSTRACT

A hearing aid and a method for operating a hearing aid is disclosed. The hearing aid comprises a processor configured to compensate for a hearing loss; a battery unit comprising a rechargeable battery; a wireless receiver element for receipt of a wireless power signal, the wireless receiver element configured to convert the wireless power signal to an electrical power signal; a detector assembly for provision of one or more detector signals including a first detector signal; and a power controller connected to the processor and the detector assembly, wherein the power controller is configured to select a power mode of the hearing aid from a plurality of power modes based on the first detector signal and apply the selected power mode in the hearing aid.

17 Claims, 5 Drawing Sheets

(56) References Cited

U.S. PATENT DOCUMENTS

2013/0272556 A1  10/2013  Hamacher
2013/0343584 A1  12/2013  Bennett et al.

FOREIGN PATENT DOCUMENTS

EP       2 894 756 A1    7/2015
WO   WO 2014/038388 A1  3/2014

OTHER PUBLICATIONS

First Technical Examination dated Jun. 20, 2016 for corresponding Danish Patent Application No. PA 2015 70809, 7 pages.

HEARING AID WITH POWER MANAGEMENT

RELATED APPLICATION DATA

This application claims priority to, and the benefit of, Danish Patent Application No. PA 2015 70809 filed Dec. 8, 2015, pending, and European Patent Application No. 15198342.6 filed Dec. 8, 2015, pending. The entire disclosures of both of the above applications are expressly incorporated by reference herein.

FIELD

The present disclosure relates to a hearing aid with power management and related method. In particular, the present disclosure relates to a hearing aid that is able to be powered by a plurality of different power sources. Further, a method of operating a hearing aid is disclosed.

BACKGROUND

With the developments in rechargeable battery technology, hearing devices with rechargeable batteries that can be charged by wire or wirelessly are emerging. A hearing device user is required to recharge the hearing device battery regularly during periods where the hearing device is not in use, e.g. during the night or other non-use periods, where the hearing device is detached from the user and turned off. If a user forgets to recharge the hearing device and the battery runs out, the user is required to detach the hearing device and place in a charger for recharging the battery before being able to use it. This is inconvenient and may reduce user friendliness.

SUMMARY

There is a need for devices and methods that improves the user friendliness of a hearing device with rechargeable batteries, in particular wirelessly rechargeable batteries.

A hearing aid is disclosed, the hearing aid comprising a processor configured to compensate for a hearing loss; a battery unit comprising a rechargeable battery; a wireless receiver element for receipt of a wireless power signal, the wireless receiver element configured to convert the wireless power signal to an electrical power signal; a detector assembly for provision of one or more detector signals including a first detector signal; and a power controller connected to the processor and the detector assembly. The power controller is configured to select a power mode of the hearing aid from a plurality of power modes based on one or more detector signals, such as the first detector signal and/or a second detector signal. The power controller is configured to apply the selected power mode in the hearing aid.

Also disclosed is a method of operating a hearing aid, the method comprising receiving, at the hearing aid, a wireless power signal from an external unit; obtaining, e.g. with a detector assembly, a first detector signal; selecting, e.g. with a power controller, a power mode of the hearing aid from a plurality of power modes based on the first detector signal; and applying the selected power mode in the hearing aid.

It is an important advantage of the hearing aid and/or method that a user of the hearing aid is able to, in a simple and convenient way, use different power sources, e.g. a stationary charger and a wireless portable external power source, for the hearing aid.

It is an important advantage of the hearing aid and/or method that the hearing aid can be powered and/or charged by different power sources.

The present disclosure allows a hearing aid user, when wearing the hearing aid, to use a wireless portable external power source for powering the hearing aid.

A hearing aid includes: a processor configured to compensate for a hearing loss; a battery unit comprising a rechargeable battery; a wireless receiver element for receipt of a wireless power signal, the wireless receiver element configured to convert the wireless power signal to an electrical power signal; a detector assembly for provision of one or more detector signals including a first detector signal; and a power controller connected to the processor and the detector assembly, wherein the power controller is configured to select a power mode of the hearing aid from a plurality of power modes based on the first detector signal, and apply the selected power mode for the hearing aid.

Optionally, the detector assembly is connected to the wireless receiver element, and wherein the first detector signal is based on a power detector signal from the wireless receiver element.

Optionally, the detector assembly comprises one or more detectors configured to respectively detect one or more power signal characteristics of the power detector signal, and wherein the first detector signal is indicative of the one or more power signal characteristics of the power detector signal.

Optionally, one of the characteristics is signal frequency, and wherein the first detector signal is indicative of the signal frequency.

Optionally, one of the characteristics is signal amplitude, and wherein the first detector signal is indicative of the signal amplitude.

Optionally, one of the characteristics is signal modulation, and wherein the first detector signal is indicative of the signal modulation.

Optionally, one of the power modes comprises a first power mode, the power controller being configured to select the first power mode if the one or more detector signals are indicative of the battery being charged with a first charging unit.

Optionally, the processor in the first power mode is configured to operate in a sleep mode.

Optionally, another one of the power modes comprises a second power mode, the power controller being configured to select the second power mode if the one or more detector signals are indicative of the processor being powered with the electrical power converted from the wireless power signal.

Optionally, the processor in the second power mode is configured to operate in a normal mode.

Optionally, the plurality of power modes comprises a default power mode, wherein the power controller is configured to select the default power mode if the one or more detector signals are indicative of no charging, and wherein the processor in the default power mode is configured to operate in a normal mode.

Optionally, the power controller is connected to the battery unit for receiving a battery signal indicative of battery status from the battery unit, and wherein the power controller is configured to select the power mode from the plurality of power modes also based on the battery signal.

Optionally, the detector assembly comprises a magnetic field sensor, the one or more detector signals including an additional detector signal indicative of a presence of a magnetic field, and wherein the power controller is configured to select the power mode from the plurality of power modes also based on the additional detector signal.

Optionally, the detector assembly comprises an accelerometer, the one or more detector signals including an additional detector signal indicative of motion of the hearing aid, and wherein the power controller is configured to select the power mode from the plurality of power modes also based on the additional detector signal.

Optionally, the detector assembly comprises a contact sensor, the one or more detector signals including an additional detector signal indicative of whether a first power unit is attached to the hearing aid, and wherein the power controller is configured to select the power mode from the plurality of power modes also based on the additional detector signal.

Optionally, the hearing aid comprises a radio unit connected to the power controller for provision of a radio input signal to the power controller, wherein the radio input signal from the radio unit is indicative of a presence of the radio unit, and wherein the power controller is configured to select the power mode from the plurality of power modes also based on the radio input signal from the radio unit.

Optionally, the processor is configured to be powered by the electrical power signal.

A method of operating a hearing aid includes: receiving, at the hearing aid, a wireless power signal from an external unit; obtaining a first detector signal; selecting a power mode of the hearing aid from a plurality of power modes based on the first detector signal; and applying the selected power mode for the hearing aid.

Other features and advantageous will be described in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
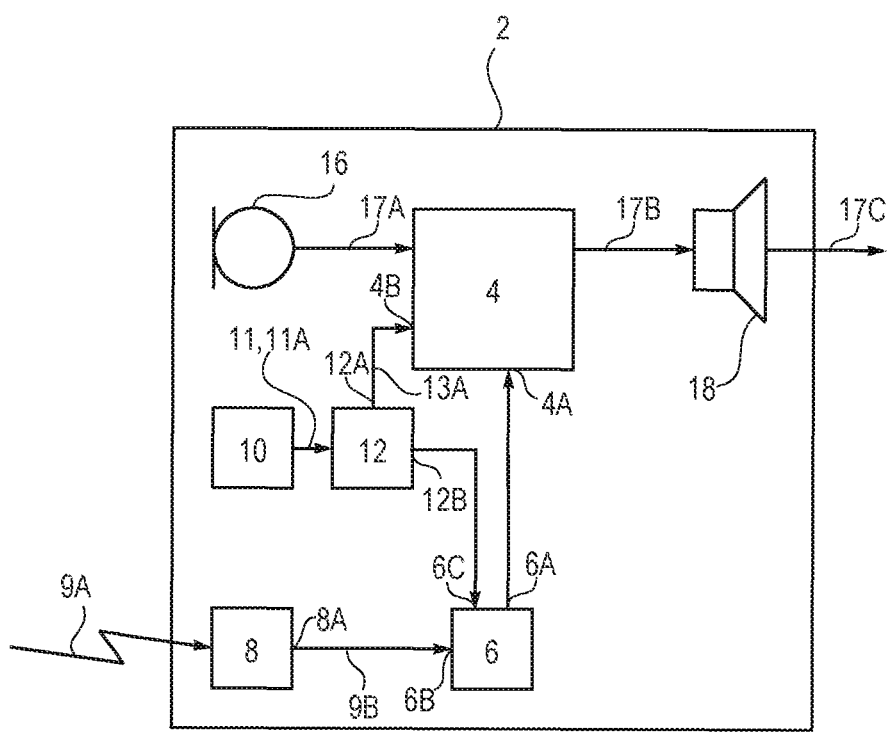
FIG. 1 schematically illustrates an exemplary hearing aid

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

The hearing aid comprises a processor configured to compensate for a hearing loss. The hearing aid comprises a microphone assembly for provision of one or more input signals to the processor. The processor processes input signal(s) from the microphone assembly and/or a radio unit and provides an output signal for conversion to an audio output signal by an output transducer also denoted a receiver. The hearing aid may be of the Behind-The-Ear, BTE, type. A BTE hearing device may be particularly advantageous since the size and position of a BTE hearing aid may allow attachment and use of an external power unit.

The hearing aid comprises a battery unit comprising a rechargeable battery. The battery unit comprises a power input terminal for receiving electrical power via electrical power signal. The battery unit optionally comprises one or more control input terminals for receiving one or more control signals from a power controller. The battery unit comprises a power output terminal for providing electrical power to electrical components of the hearing aid, e.g. the processor. The battery unit optionally comprises a switching circuit configured to feed electrical power received on the power input terminal to the battery, e.g. for charging the battery in a first power mode, based on control signal(s) received on the control input terminal(s) of the battery unit. The switching circuit may be configured to feed electrical power received on the power input terminal to the power output terminal, e.g. for powering the processor in a second power mode, based on control signal(s) received on the control input terminal(s) of the battery unit. In an exemplary hearing aid, the switching circuit may be configured to feed electrical power to both the battery for charging the battery and to the power output terminal for powering the processor.

The hearing aid comprises a wireless receiver element for receipt of a wireless power signal, the wireless receiver element configured to convert the wireless power signal to an electrical power signal. The wireless receiver element comprises an induction coil and optionally a rectifier circuit. The induction coil transforms the wireless power signal to an AC power signal and the AC power signal is converted to the electrical power signal being a DC power signal with the rectifier circuit. In an exemplary hearing aid, the electrical power signal is the AC power signal from the induction coil and the battery unit comprises a rectifier circuit for converting the electrical power signal to a DC power signal.

The hearing aid comprises a detector assembly for provision of one or more detector signals including a first detector signal. The detector assembly may comprise one or more first detectors including a primary first detector and/or a secondary first detector, and the first detector signal may be based on the output of the first detector(s).

The detector assembly may be connected to the wireless receiver element, e.g. for receiving a power detector signal. The first detector signal may be based on a power detector signal from the wireless receiver element. The power detector signal may be the AC or DC power signal.

The detector assembly may comprise one or more first detectors, each first detector configured to detect a power signal characteristic of the power detector signal. The first detector signal may be indicative of one or more power signal characteristics of the power detector signal.

A first power characteristic of the one or more power signal characteristics of the power detector signal may be signal frequency, and the first detector signal may be indicative of the signal frequency. Accordingly, a primary first detector of the detector assembly may be a frequency detector.

A second power characteristic of the one or more power signal characteristics of the power detector signal may be signal amplitude, and the first detector signal may be indicative of the signal amplitude. Accordingly, a secondary first detector of the detector assembly may be an amplitude detector.

A third power characteristic of the one or more power signal characteristics of the power detector signal may be signal modulation, and the first detector signal may be indicative of the signal modulation. Accordingly, a tertiary first detector of the detector assembly may be a modulation detector.

The detector assembly may comprise a logical circuit configured to determine the first detector signal based on respective output signals of the one or more first detectors. For example, the first detector signal may be set to a first value indicative of a first power mode if the frequency of the power detector signal as detected by a primary first detector is within a first frequency range, e.g. from 14 to 16 MHz or corresponds to a first frequency, e.g. 15 MHz. For example, the first detector signal may be set to a second value indicative of a second power mode if the frequency of the power detector signal as detected by a primary first detector is within a second frequency range, e.g. from 100 to 150 kHz or corresponds to a second frequency, e.g. of 125 kHz.

In one or more exemplary hearing aids, the first detector signal may be set to a first value indicative of a first power mode if the amplitude (voltage or current) of the power detector signal as detected by a secondary first detector is within a first amplitude range, is larger than a first amplitude threshold, or corresponds to a first amplitude, e.g. larger than 50% of nominal charging amplitude. The first detector signal may be set to a second value indicative of a second power mode if the amplitude (voltage or current) of the power detector signal as detected by a secondary first detector is within a second amplitude range, is larger than a second amplitude threshold, or corresponds to a second amplitude e.g. larger than 50% of nominal external power amplitude.

The first detector signal may be set to a default value indicative of a default power mode if the amplitude of the power detector signal as detected by a secondary first detector is less than a threshold value. A low amplitude of the power detector signal may thus be regarded as indicative of no external powering.

Accordingly, the power controller may be configured to select a power mode of the hearing aid based on frequency characteristics and/or amplitude characteristics of a power detector signal from the wireless receiver element.

The detector assembly may comprise a magnetic sensor, such as a hall element or a reed switch. The one or more detector signals may include a second detector signal indicative of presence of a magnet, e.g. based on output from the magnetic sensor. The power controller may be configured to select the power mode from a plurality of power modes based on the second detector signal.

The detector assembly may comprise an accelerometer. The one or more detector signals may include a third detector signal indicative of motion of the hearing aid, e.g. based on output from the accelerometer. The power controller may be configured to select the power mode from a plurality of power modes based on the third detector signal.

The detector assembly may comprise a contact sensor. The one or more detector signals may include a fourth detector signal indicative of whether a first power unit is attached to the hearing aid, e.g. based on output from the contact sensor. The power controller may be configured to select the power mode from a plurality of power modes based on the fourth detector signal.

The hearing aid is configured to operate in a plurality of power modes, e.g. including a first power mode and/or a second power mode, e.g. based on control signal(s) from the power controller. The plurality of power modes may include a default power mode.

The first power mode may be characterized in that the battery is charged with a first charging unit. In the first power mode, the processor may be configured to operate in a sleep mode, e.g. including muting of output transducer. In the sleep mode, the processor may turn off, mute or disable different functionalities or parts of normal hearing aid operation, e.g. hearing loss compensation. In the first power mode, the battery unit may be configured to switch off power on the power output terminal. In the first power mode, the battery unit may be configured to charge the battery. The first power mode may be a wireless charging mode wherein the battery of the hearing aid is charged.

The second power mode may be characterized in that the processor is powered by a first power unit. The second power mode may be characterized in that the battery is charged by the first power unit. In the second power mode, the processor may be configured to operate in normal mode. In the second power mode, the battery unit may be configured to power the processor with the electrical power signal from the wireless receiver element. The second power mode may be an external power mode wherein the hearing aid is powered, e.g. during normal operation, by an external wireless power source.

The default power mode may be characterized in that the processor is powered by the battery of the hearing aid. In the default power mode, the processor may be configured to operate in normal mode. In the default power mode, the battery unit may be configured to power the processor with the battery.

The hearing aid comprises a power controller connected to the processor and the detector assembly. The power controller is configured to select a power mode of the hearing aid from a plurality of power modes based on one or more detector signals, such as the first detector signal and/or a second detector signal. The power controller is configured to apply the selected power mode in the hearing aid, e.g. by sending one or more control signals to the processor and/or other components of the hearing aid, such as radio unit and/or battery unit.

In one or more exemplary hearing aids, the power controller may be configured to select a first power mode, wherein the battery is charged, if the one or more detector signals are indicative of charging with a first charging unit. The processor may in the first power mode during charging be configured to operate in a sleep mode.

In one or more exemplary hearing aids, the power controller may be configured to select a second power mode, wherein the processor is powered by the electrical power signal, if the one or more detector signals are indicative of powering with a first power unit. The processor may in the second power mode be configured to operate in normal mode.

In one or more exemplary hearing aids, the power controller may be configured to select a default power mode if the one or more detector signals are indicative of no charging, and wherein the processor in the default power mode is configured to operate in normal mode.

The power controller may be connected to the battery unit for receiving a battery signal indicative of battery status from the battery unit. The power controller may be configured to select the power mode from a plurality of power modes based on the battery signal. For example the battery signal may be a logical signal, where e.g. logic "0" indicates low battery capacity (charging needed) and logic "1" is indicative of high battery capacity (no charging needed). In one or more exemplary hearing aids, the battery signal may be a digital or analog signal indicative of battery status.

The hearing aid may comprise a radio unit connected to the power controller for provision of a radio input signal to the power controller. The radio input signal from the radio unit may be indicative of presence of a first charging unit and/or a first power unit. The power controller may be configured to select the power mode from a plurality of power modes based on the radio input signal from the radio unit.

In the method, the plurality of power modes may include a first power mode as described herein and/or a second power mode as described herein. In the method, selecting a power mode may comprise selecting a first power mode if the first detector signal or a combination of detector signals is indicative of a first charging unit sending a wireless power signal. In the method, selecting a power mode may comprise selecting a second power mode if the first detector signal or a combination of detector signals is indicative of a first power unit sending a wireless power signal.

FIG. 1 schematically illustrates an exemplary hearing aid. The hearing aid 2 comprises a processor 4 configured to compensate for a hearing loss. The hearing aid 2 comprises a battery unit 6 comprising a rechargeable battery (not shown in FIG. 1). The battery unit 6 comprises a power output terminal 6A for providing electrical power to electrical components of the hearing aid, e.g. the processor 4. The power output terminal 6A is connected to a power input terminal 4A of the processor 4. The hearing aid 2 comprises a wireless receiver element 8 for receipt of a wireless power signal 9A. The wireless receiver element 8 is configured to convert the wireless power signal 9A to an electrical power signal 9B, the electrical power signal 9B being provided to the battery unit 6 on power output terminal 8A connected to power input terminal 6B of the battery unit 6. The hearing aid 2 comprises a detector assembly 10 for provision of one or more detector signals 11 including a first detector signal 11A. The hearing aid 2 comprises a power controller 12 connected to the detector assembly 10. The power controller 12 is connected to the processor 4 and/or the battery unit 6. A control output 12A of the power controller 12 is optionally connected to a control input 4B of the processor 4 for controlling the processor according to a selected power in order to apply the selected power mode in the hearing aid 2. A control output 12B of the power controller 12 is optionally connected to a control input 6C of the battery unit 6 for controlling the battery unit 6 according to a selected power in order to apply the selected power mode in the hearing aid 2.

The power controller 12 is configured to select a power mode of the hearing aid 2 from a plurality of power modes based on the first detector signal 11A and apply the selected power mode in the hearing aid 2 by sending control signal 13A to the processor 4 and/or sending control signal to the battery unit 6 via control output 12B.

The hearing aid 2 comprises a microphone assembly 16 for provision of one or more input signals 17A to the processor 4. The processor 4 processes input signal(s) 17A from the microphone assembly 16 and/or optionally a radio unit (not shown in FIG. 1) and provides an output signal 17B for conversion to an audio output signal 17C by an output transducer 18 also denoted a receiver.

Figure 2:
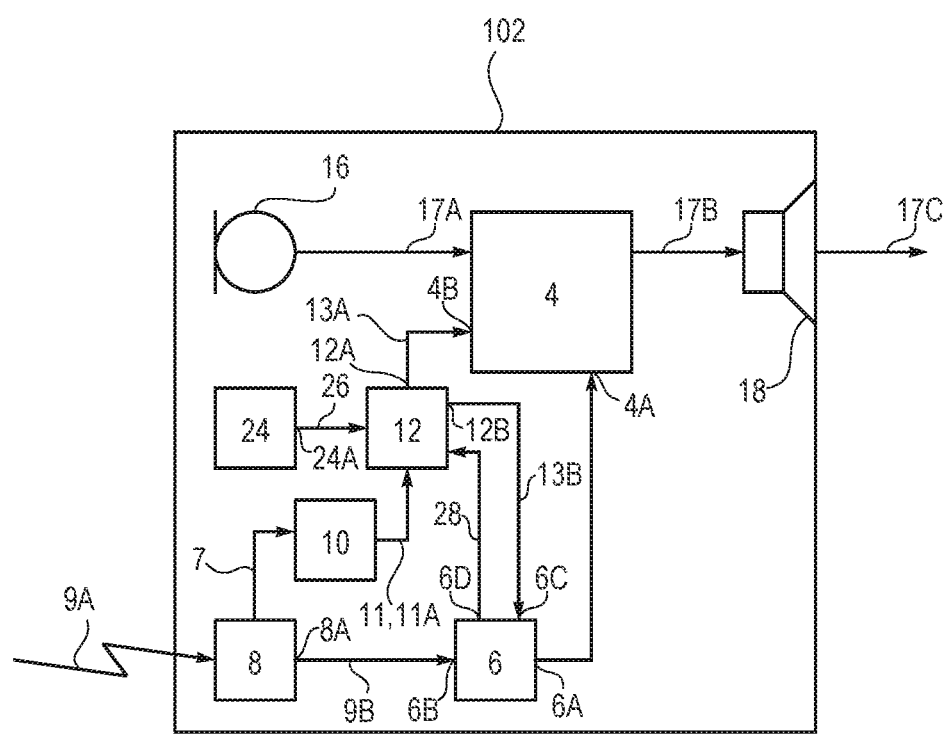
FIG. 2 schematically illustrates an exemplary hearing aid.

FIG. 2 illustrates an exemplary hearing aid 102. In addition to the components already described in relation to FIG. 1, the hearing aid 102 optionally comprises a radio unit 24 having an output terminal 24A connected to an input of the power controller 12 for provision of a radio unit signal 26 indicative of whether a first charging unit is present and provides a wireless power signal 9A to the hearing aid 2. The power controller 12 is configured to select a power mode of the hearing aid from a plurality of power modes based on the radio unit signal 26 first detector signal and apply the selected power mode in the hearing aid 102. The detector assembly 10 is connected to the wireless receiver element 8 for receiving a power detector signal 7. The first detector signal 11A is based on the power detector signal 7 from the wireless receiver element 8. In one or more hearing aids, the first detector signal is indicative of a first power mode if the power detector signal 7 is indicative of a first charging unit providing wireless power signal 9A. In one or more hearing aids, the first detector signal is indicative of a second power mode if the power detector signal 7 is indicative of a first power unit providing wireless power signal 9A. A control output 6D of the battery unit 6 is connected to an input of the power controller 12 for provision of a battery signal 28 indicative of battery status from the battery unit 6. The power controller 12 is configured to select the power mode from a plurality of power modes based on the battery signal 28.

Figure 3:
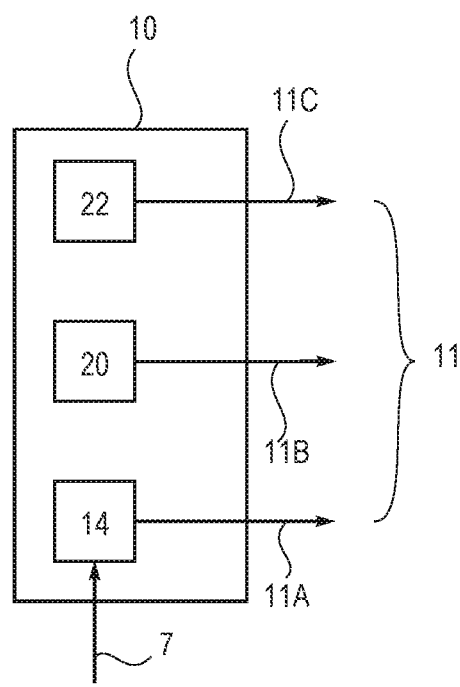
FIG. 3 schematically illustrates an exemplary detector assembly.

FIG. 3 shows an exemplary detector assembly 10. The detector assembly 10 comprises a primary first detector 14 configured to provide the first detector signal 11A based on the power detector signal 7. Further, the detector assembly 10 optionally comprises a magnetic sensor 20 configured to provide a second detector signal 11B. The second detector signal 11B indicative of presence of a magnet (not shown in FIG. 3), e.g. arranged in a first charging unit (not shown). Thus, the second detector signal 11B may be used for determining whether a first charging unit is present. The power controller 12 is optionally configured to select the power mode from a plurality of power modes based on the second detector signal 11B. The detector assembly 10 optionally comprises an accelerometer 22 configured to provide a third detector signal 11C indicative of motion of the hearing aid. Detection of motion may indicate that the hearing aid is not charged with a first (stationary) charging unit. Thus, the one or more detector signals 11 provided by the detector assembly 10 may comprise at least three detector signals 11A, 11B, 11C.

Figure 4:
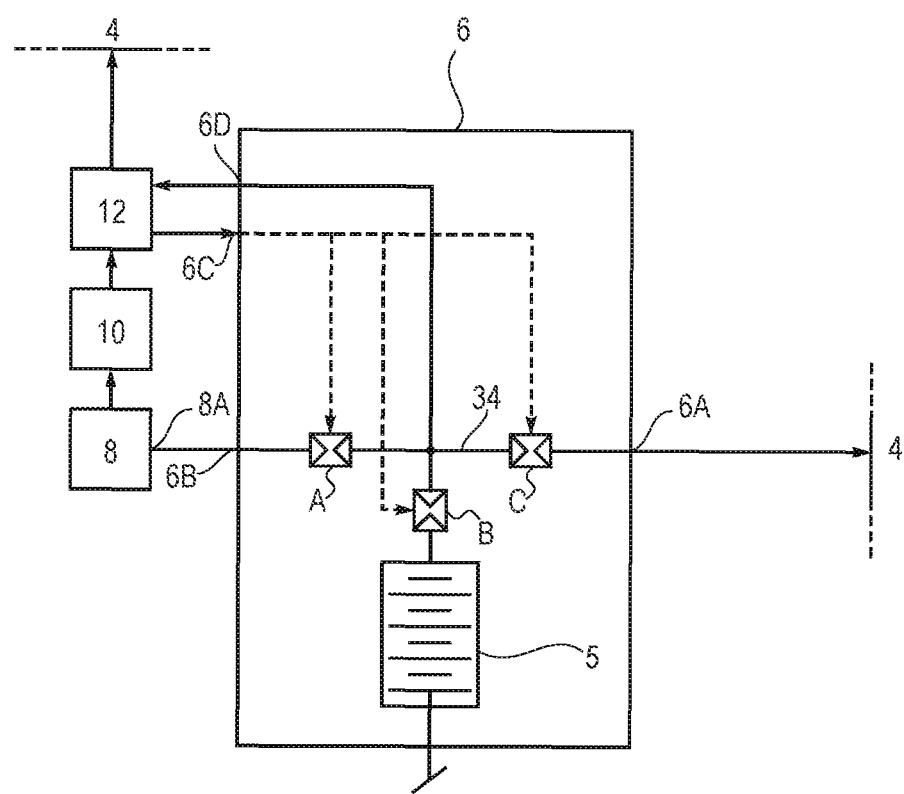
FIG. 4 schematically illustrates an exemplary battery unit.

FIG. 4 schematically illustrates an exemplary battery unit 6. The battery unit 6 comprises a rechargeable battery 5 and connectable inputs/outputs of the battery unit 6 via one or more controllable switches A, B, C. The battery unit 6 is configured to couple/decouple the battery 5 to/from power input terminal 6B via first switch A based on control signal from power controller 12 on control input 6C. The battery unit 6 is configured to couple/decouple the battery 5 to/from power conductor 34 with second switch B based on control signal from power controller 12 on control input 6C. This is particularly useful in a second power mode, where the power signal 9B on the power input terminal 6B is used to power the processor 4 connected to the power output terminal 6A without charging the battery 5. The battery unit 6 is configured to couple/decouple the battery 5 to/from power output terminal 6A via third switch C based on control signal from power controller 12 on control input 6C. Optionally, the battery unit comprises a control output 6D connected to the power conductor 34 for providing a battery signal to the power controller 12.

Examples on switch settings for different power modes are indicated in Table 1. In Table 1, "1" indicates a closed switch (coupled), i.e. electrical contact between the two terminals, and "0" indicates an open switch (decoupled), i.e. no electrical contact between the two terminals. In an exemplary third power mode, the switches A, B and C are closed, thus allowing both charging of the battery 5 with the electrical power signal 9B and feeding the power output terminal 6A of the battery unit 6 with the electrical power signal 9B. Further, Table 1 shows exemplary control signal values for control signal from the power controller 12 to the processor 4 in different modes, where "0" indicates normal mode, "1" indicates sleep mode and "2" indicates "power off" mode.

TABLE 1

|  | First power mode | Second power mode | Default power mode |
| --- | --- | --- | --- |
| Switch A | 1 | 1 | 0 |
| Switch B | 1 | 0 or 1 | 1 |
| Switch C | 0 or 1 | 1 | 1 |
| Control signal to processor | 1 if Switch C = 1<br>2 if Switch C = 0 | 0 | 0 |

Further, Table 2 below shows exemplary operation of the power controller 12 and selection of power mode based on the one or more detector signals 11A, 11B, 11B, radio unit signal 26 and battery signal 28. Exemplary selected power mode based on different values of detector signal(s) 11, radio unit signal 26 and/or battery signal are indicated, wherein N/A indicates that the respective signal (or component providing the signal) is not present in the hearing aid or does not affect the selection of the respective power mode. For the first detector signal, "0" indicates that the frequency of the power detector signal is less than a threshold value or that the frequency of the power detector signal is within a first frequency range and "1" indicates that the frequency of the power detector signal is larger than a threshold value or that the frequency of the power detector signal is within a second frequency range. For the second detector signal, "0" indicates that the magnetic sensor 20 does not detect a magnet (no first charging unit present) and "1" indicates that the magnetic sensor detects a permanent magnet (first charging unit present). For the third detector signal, "0" indicates that the accelerometer 22 does not detect motion (hearing aid arranged in first charging unit) and "1" indicates that the accelerometer 22 detects motion (hearing aid worn by user). For the radio unit signal, "0" indicates that the radio unit 24 does not receive a presence signal from a first charging unit (hearing aid not arranged in first charging unit) and "1" indicates that the radio unit 24 receives a presence signal from a first charging unit (hearing aid arranged in first charging unit). For the battery signal, "0" indicates that the battery charging status is low and "1" indicates that the battery charging status is high.

TABLE 2

|  | First power mode | Second power mode | Default power mode |
| --- | --- | --- | --- |
| First detector signal | 0 | 1 | 0 |
| Second detector signal | 1 or N/A | 0 or N/A | 0 |
| Third detector signal | 0 or N/A | 1 or N/A | 1 or N/A |
| Radio unit signal | 1 or N/A | 0 or N/A | 0 or N/A |
| Battery signal | 0 or N/A | N/A | 1 or N/A |

Figure 5:
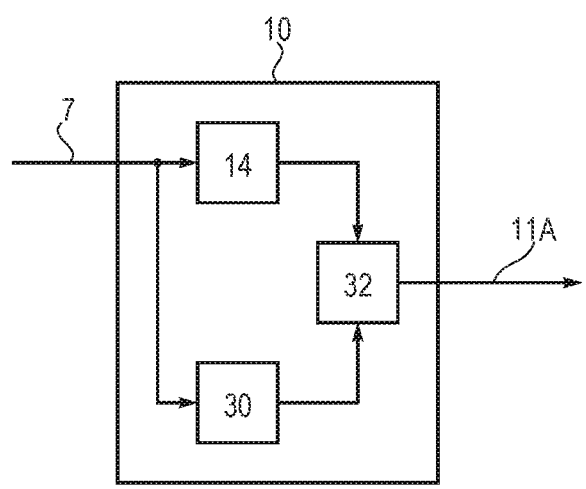
FIG. 5 schematically illustrates an exemplary detector assembly.

FIG. 5 shows an exemplary detector assembly 10. The detector assembly 10 comprises a primary first detector 14 being a frequency detector configured to provide an output signal indicative of frequency of the power detector signal 7. The detector assembly comprises a secondary first detector 30 being an amplitude detector configured to provide an output signal indicative of amplitude of the power detector signal 7. The detector assembly 10 comprises a logical circuit 32 configured to determine the first detector signal 11A based on respective output signals of the primary first detector 14 and the secondary first detector 30. The logical circuit 32 may set the first detector signal to a first value indicative of a first power mode if the frequency of the power detector signal as detected by the primary first detector 14 is within a first frequency range used by a first charging unit and the amplitude of the power detector signal 7 is larger than a threshold value. The logical circuit 32 may set the first detector signal 11A to a second value indicative of a second power mode if the frequency of the power detector signal 7 as detected by the primary first detector 14 is within a second frequency range used by a first power unit and the amplitude of the power detector signal is larger than a threshold value. The logical circuit 32 may set the first detector signal 11A to a default value indicative of default power mode if the amplitude of the power detector signal 7 is less than a threshold value. The logical circuit 32 may be omitted, and the output signals of the primary first detector 14 and the secondary first detector 30 may be used as detector signals and fed directly to the power controller 12

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 2 hearing aid
4 processor
4A power input terminal
4B control input
5 battery
6 battery unit
6A power output terminal of battery unit
6B power input terminal of battery unit
6C control input of battery unit
6D control output of battery unit
7 power detector signal
8 wireless receiver element
8A power output terminal of wireless receiver element
9A wireless power signal
9B electrical power signal
10 detector assembly
11 one or more detector signals
11A first detector signal
11B second detector signal
11C third detector signal
12 power controller
12A control output
12B control output
13A control signal from power controller to processor
13B control signal from power controller to battery unit
14 primary first detector 16 microphone assembly
17A input signal(s)
17B output signal
17C audio output signal
18 output transducer
20 magnetic sensor
22 accelerometer
24 radio unit
26 radio unit signal
28 battery signal
30 secondary first detector
32 logical circuit
34 power conductor

The invention claimed is:

1. A hearing aid comprising:
a processor configured to compensate for a hearing loss;
a battery unit comprising a rechargeable battery;
a wireless receiver element for receipt of a wireless power signal, the wireless receiver element configured to convert the wireless power signal to an electrical power signal;
a detector assembly for provision of one or more detector signals including a first detector signal; and
a power controller connected to the processor and the detector assembly,
wherein the power controller is configured to select a power mode of the hearing aid from a plurality of power modes based on the first detector signal, and apply the selected power mode for the hearing aid; and
wherein the plurality of power modes comprises a wireless powering mode in which at least some of the electrical power converted from the wireless power signal powers the processor without charging the rechargeable battery.

2. The hearing aid according to claim 1, wherein the detector assembly is connected to the wireless receiver element, and wherein the first detector signal is based on a power detector signal from the wireless receiver element.

3. The hearing aid according to claim 2, wherein the detector assembly comprises one or more detectors configured to respectively detect one or more power signal characteristics of the power detector signal, and wherein the first detector signal is indicative of the one or more power signal characteristics of the power detector signal.

4. The hearing aid according to claim 3, wherein one of the characteristics is signal frequency, and wherein the first detector signal is indicative of the signal frequency.

5. The hearing aid according to claim 3, wherein one of the characteristics is signal amplitude, and wherein the first detector signal is indicative of the signal amplitude.

6. The hearing aid according to claim 3, wherein one of the characteristics is signal modulation, and wherein the first detector signal is indicative of the signal modulation.

7. The hearing aid according to claim 1, wherein the plurality of power modes comprises a first power mode, the wireless powering mode being a second power mode, the power controller being configured to select the first power mode if the one or more detector signals are indicative of the battery being charged with a first charging unit.

8. The hearing aid according to claim 7, wherein the processor in the first power mode is configured to operate in a sleep mode.

9. The hearing aid according to claim 7, the power controller being configured to select the second power mode if the one or more detector signals are indicative the wireless power signal being received by the hearing aid.

10. The hearing aid according to claim 1, wherein the processor in the wireless powering mode is configured to operate in a normal mode.

11. The hearing aid according to claim 1, wherein the plurality of power modes comprises a default power mode, wherein the power controller is configured to select the default power mode if the one or more detector signals are indicative of no charging, and wherein the processor in the default power mode is configured to operate in a normal mode.

12. The hearing aid according to claim 1, wherein the power controller is connected to the battery unit for receiving a battery signal indicative of battery status from the battery unit, and wherein the power controller is configured to select the power mode from the plurality of power modes also based on the battery signal.

13. The hearing aid according to claim 1, wherein the detector assembly comprises a magnetic field sensor, the one or more detector signals including an additional detector signal indicative of a presence of a magnetic field, and wherein the power controller is configured to select the power mode from the plurality of power modes also based on the additional detector signal.

14. The hearing aid according to claim 1, wherein the detector assembly comprises an accelerometer, the one or more detector signals including an additional detector signal indicative of motion of the hearing aid, and wherein the power controller is configured to select the power mode from the plurality of power modes also based on the additional detector signal.

15. The hearing aid according to claim 1, wherein the detector assembly comprises a contact sensor, the one or more detector signals including an additional detector signal indicative of whether a first power unit is attached to the hearing aid, and wherein the power controller is configured to select the power mode from the plurality of power modes also based on the additional detector signal.

16. The hearing aid according to claim 1, wherein the hearing aid comprises a radio unit connected to the power controller for provision of a radio input signal to the power controller, wherein the radio input signal from the radio unit is indicative of a presence of the radio unit, and wherein the power controller is configured to select the power mode from the plurality of power modes also based on the radio input signal from the radio unit.

17. A method of operating a hearing aid having a processor and a rechargeable battery, comprising:
receiving, at the hearing aid, a wireless power signal from an external unit;
obtaining a first detector signal;
selecting a power mode of the hearing aid from a plurality of power modes based on the first detector signal; and
applying the selected power mode for the hearing aid;
wherein the plurality of power modes comprises a wireless powering mode in which electrical power converted from at least some of the wireless power signal powers the processor without charging the rechargeable battery.

* * * * *